US010932144B2

United States Patent
Sjödin et al.

(10) Patent No.: US 10,932,144 B2
(45) Date of Patent: Feb. 23, 2021

(54) DISTURBANCE DETECTION FOR TRANSPORT LINKS

(71) Applicant: Telefonaktiebolaget LM Ericsson (publ), Stockholm (SE)

(72) Inventors: Martin Sjödin, Gothenburg (SE); Stefan Håkansson, Hisings Backa (SE); Jonas Hansryd, Gothenburg (SE); Patrik Olesen, Floda (SE); Mohamed Mustafa, Gothenburg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 110 days.

(21) Appl. No.: 16/017,325

(22) Filed: Jun. 25, 2018

(65) Prior Publication Data

US 2019/0394657 A1 Dec. 26, 2019

(51) Int. Cl.
*H04W 24/04* (2009.01)
*H04W 24/08* (2009.01)
*H04W 24/10* (2009.01)

(52) U.S. Cl.
CPC ............ *H04W 24/04* (2013.01); *H04W 24/08* (2013.01); *H04W 24/10* (2013.01)

(58) Field of Classification Search
None
See application file for complete search history.

(56) References Cited

U.S. PATENT DOCUMENTS

| | | | |
|---|---|---|---|
| 8,984,939 B1 | 3/2015 | Eilts et al. | |
| 9,596,615 B1* | 3/2017 | Sun | H04L 1/0027 |
| 2009/0160700 A1 | 6/2009 | Messer-Yaron et al. | |
| 2010/0150067 A1* | 6/2010 | Penisoara | H04W 52/0277 370/328 |
| 2015/0145717 A1* | 5/2015 | Lim | G01S 7/025 342/26 R |
| 2017/0280389 A1* | 9/2017 | Guilhaumon | H04W 52/0216 |
| 2018/0287830 A1* | 10/2018 | Merlin | H04L 25/0224 |
| 2019/0150737 A1* | 5/2019 | Bodurka | A61G 7/00 |

(Continued)

FOREIGN PATENT DOCUMENTS

WO 2018036608 A1 3/2018

OTHER PUBLICATIONS

Lopez-Roldan, J. et al., "Development of a Pocket Ultrahigh Frequency Partial-Discharge Detector to Warn Switchyard Personnel of Imminent Failure of a Nearby High-Voltage Plant", IEEE Electrical Insulation Magazine, Jan.-Feb. 2012, pp. 6-11, vol. 28, No. 1.

(Continued)

*Primary Examiner* — Shripal K Khajuria
(74) *Attorney, Agent, or Firm* — Coats & Bennett PLLC

(57) ABSTRACT

The method comprises sampling transport data received on the transport link to determine properties of the transport link. The method comprises detecting the disturbance of the transport link based on the determined properties of the transport link. The method comprises, responsive to the detecting the disturbance, determining, based on the sampled received transport data, the cause of the disturbance. The method further comprises, responsive to detecting the disturbance, refraining from transmitting an indication of the disturbance or transmitting the indication of the disturbance with an instruction for resolving the disturbance.

22 Claims, 7 Drawing Sheets

(56) References Cited

U.S. PATENT DOCUMENTS

2019/0182881 A1* 6/2019 Teyeb .................. H04W 76/15
2019/0260496 A1* 8/2019 Emmanuel ........... H04B 17/391

OTHER PUBLICATIONS

Overeem, A. et al., "Measuring urban rainfall using microwave links from commercial cellular communication networks", Water Resources Research, Dec. 6, 2011, pp. 1-16, vol. 47, W12505.

Kim, M. et al., "Rainfall Detection and Rainfall Rate Estimation Using Microwave Attenuation", Atmosphere, Jul. 24, 2018, pp. 1-21, vol. 9, MDPI.

Olausson et al. "Disturbance Detection and Classification in Large Microwave Networks."; Master's Thesis in Computer Science; 2017; pp. 1-48; Department of Engineering, Chalmers University of Technology; Gothenburg, Sweden.

* cited by examiner

DISTURBANCE DETECTION FOR TRANSPORT LINKS

TECHNICAL FIELD

The present disclosure relates generally to detection of disturbance on a transport link, and more particularly, to the detection of disturbance to a microwave transport link.

BACKGROUND

Microwave transmission is used for communication in a wide variety of applications, including satellite transmission, backbone carriers for cellular networks, long-distance communication, short-range indoor communication, etc. A microwave link in a communication system is a beam of radio waves in the microwave frequency range used to transmit video, audio or other data between two locations. Microwaves have short wavelength that allows direction of communication in narrow beams. However, microwave transmission is limited in that it is line-of-sight communication unable to pass around obstacles, e.g. hills or mountains. For instance, antenna equipment used for long-distance microwave transmission is installed in elevated locations and must have a pathway that is free of obstacles. Consequently environmental factors can affect the performance of microwave links. For instance, microwave links are sensitive to rain, or water in the atmosphere, pollen, solar flares, sand storms, etc. Microwave links are also sensitive to equipment changes such as a swaying sender or receiver. Operators at Network Operations Centers (NOC) monitor the performance of microwave links and receive warnings if performance declines whether or not the cause of the declining performance is an obstacle that the operators can control.

SUMMARY

One or more embodiments herein are useful for improving the maintenance and operation of transport links (e.g., microwave transport links). In particular, in one or more embodiments a disturbance of a transport link is detected. An operator monitoring the performance of a transport link (e.g., at a Network Operations Center) is informed of an obstacle in the path of the transport link in order to change the operation of the transport link or fix equipment associated with the transport link.

Embodiments herein include a method of detecting a disturbance of a transport link. The method comprises sampling transport data received on the transport link to determine properties of the transport link (e.g., a received power or attenuation of the link carrying the transport data). The method comprises detecting the disturbance (e.g., a heavy rain or swaying equipment) of the transport link based on the determined properties of the transport link. The method comprises responsive to the detecting the disturbance determining, based on the sampled received transport data, the cause of the disturbance. The method further comprises refraining from transmitting an indication of the disturbance (e.g., suppressing a warning message of the disturbance). Alternatively, the method comprises transmitting the indication of the disturbance with an instruction for resolving the disturbance (e.g., to stabilize the equipment).

In one or more embodiments, the refraining from transmitting an indication comprises suppressing a warning indication of a declined performance for transport data transmitted on the transport link.

In one or more embodiments, the method further comprises receiving the transport data and sampling a subset of the transport data at predetermined intervals.

In one or more embodiments, the cause of the disturbance is caused by liquids or solids in the path of the transport link.

In one or more embodiments, the cause of the disturbance is malfunction of the equipment at an endpoint of the transport link, and the method comprises transmitting the indication of the disturbance with an instruction related to the malfunction of the equipment.

In one or more embodiments, the cause of the disturbance is movement of the transmitter or receiver at an endpoint of the transport link, and the method comprises transmitting the indication of the disturbance with an instruction related to correcting the movement of the transmitter or receiver.

In one or more embodiments, the cause of the disturbance is a temporary obstacle in the path of the transport link, and the method comprises selectively determining whether to refrain from sending the indication or transmit the indication with an instruction related to increasing the transmission power of an end point of the transport link.

In one or more embodiments, the detecting comprises comparing the properties of the received transport data to classes of learned channel conditions.

In one or more embodiments, the sampling comprises forming a vector of channel conditions, and detecting the disturbance comprises classifying the vector as a particular channel condition.

In one or more embodiments, the classes of learned channel conditions are based on sampling of received transport data on other transport links. For instance, in one or more embodiments, the other transport links are selected based on their proximity to the transport link or proximity to an environmental feature.

In one or more embodiments, the classes of learned channel conditions are based on sampling of other received transport data received on the transport link.

In one or more embodiments, the properties of the transport link include an attenuation of the transport link. In one or more embodiments, the properties of the transport link further include a quality of a received signal associated with the received transport data on the transport link.

In one or more embodiments, the sampling comprises sampling one or more of a received power, a transmission power, and a mean square error (MSE) associated with the received transport data.

In one or more embodiments, the transport link is a microwave transport link.

In one or more embodiments, the transport data is one or more of audio and video data.

Embodiments herein include a method of receiving a detected disturbance of a transport link. The method comprises monitoring or controlling the transport link; and receiving an indication of the disturbance on the transport link and an instruction for resolving the disturbance. The instruction for resolving the disturbance is based on a cause of the disturbance determined from sampled properties of transport data received on the transport link.

In one or more embodiments, the method of receiving a detected disturbance of the transport link further comprises responsive to the indication of the disturbance, adjusting the operation of the transport link.

Those skilled in the art will also appreciate that embodiments herein further include corresponding computer programs.

A computer program comprises instructions which, when executed on at least one processor of an apparatus, cause the apparatus to carry out any of the respective processing described above. A computer program in this regard can comprise one or more code modules corresponding to the means or units described above.

Embodiments further include a carrier containing such a computer program. This carrier can comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product can be stored on a computer readable recording medium.

Additional embodiments will now be described. At least some of these embodiments can be described as applicable in certain contexts for illustrative purposes, but the embodiments are similarly applicable in other contexts not explicitly described.

DETAILED DESCRIPTION

Figure 1:
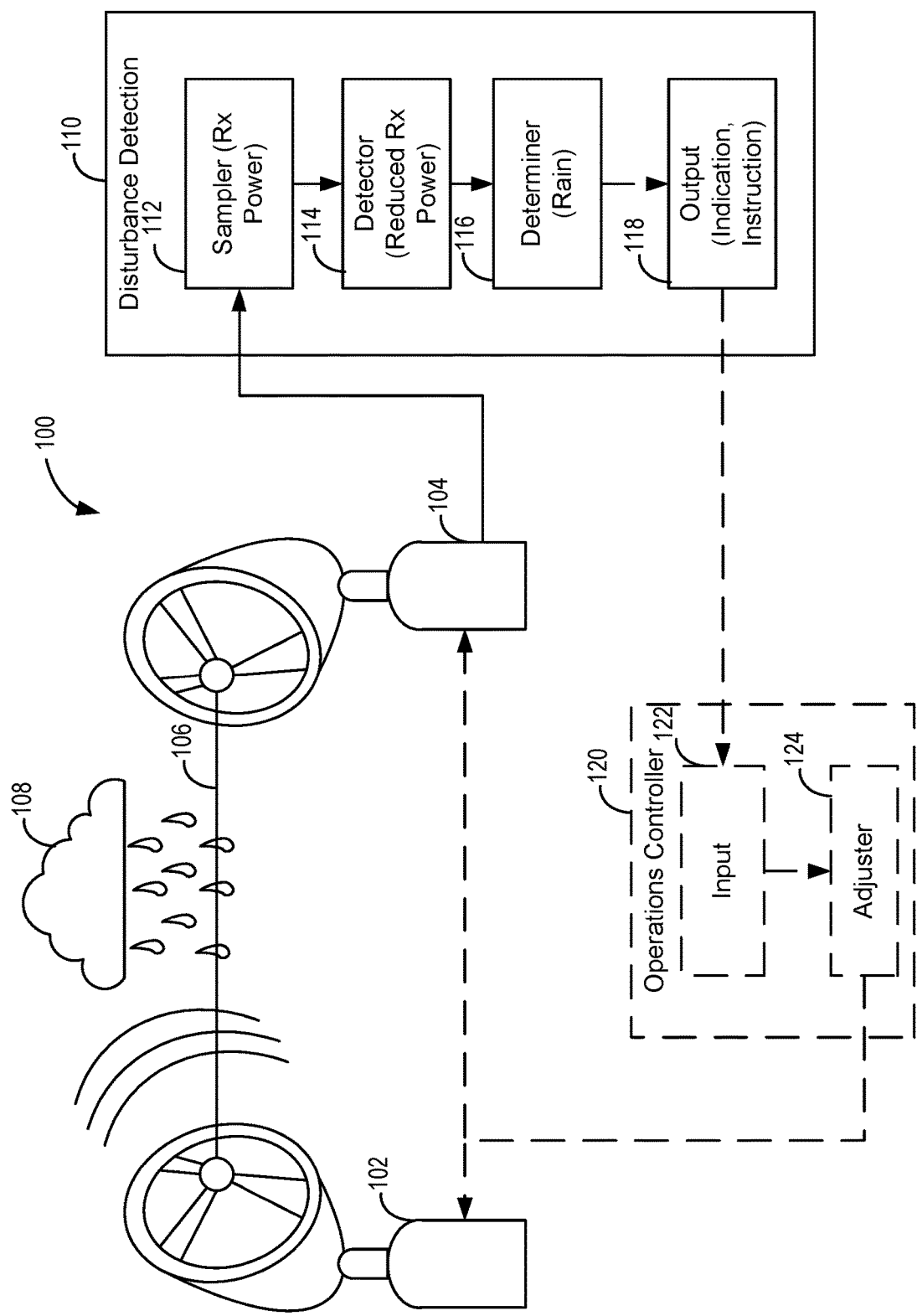
FIG. 1 is a system diagram for detecting a disturbance on a transport link according to an embodiment.

FIG. 1 depicts a system 100 for detecting a disturbance in a transport link 106. Transmitter 102 and receiver 104 form two end points for transport link 106 (e.g., a microwave transport link). Transmitter 102 transmits transport data (e.g., audio or video data) to receiver 104 over the transport link 106 that forms a transmission path or link for the transport data.

A disturbance 108 interferes with the transport link and its transmission of the transport data. In the system 100 of FIG. 1 the disturbance is rain, but the disturbance could be any disturbance which would interfere with the operation of the transport link 106 including temporary obstacles (e.g., equipment of a construction site), environmental obstacles (e.g. pollen in the air), equipment malfunction (e.g., transmitter stops transmitting), equipment instability (e.g., swaying sender or receiver).

A disturbance detection apparatus 110 of system 100 is used to detect disturbances on the transport link 106. The disturbance detection apparatus 110 comprises a sampler 112 that samples transport data received on the transport link 106 to determine properties of the transport link. In FIG. 1, the disturbance detection apparatus 110 samples received power. In one or more embodiments, other information or properties of the received transport data is sampled in addition to or instead of received power. For example, the sampler 112 could sample attenuation, which is the difference between a transmitted power and a received power of the transport link 106. Additionally or alternatively, the sampler is used to sample qualities of signals carrying the transport data transmitted on the transport link (e.g., a mean square error). In one or more embodiments, the disturbance detection apparatus 110 is at an end point of the transport link for sampler 112 to directly sample the transport data received at the end point receiver 104. Alternatively, the sampler 112 coordinates with the receiver 104 or equipment at receiver 104 for receiving samples of the transport data for determining properties of the transport link 106.

The disturbance detection apparatus 110 includes a detector 114 for detecting a disturbance on the transport link 106. In the example of FIG. 1, the detector detects that the received power is reduced on the transport link 106. However, there could be many causes of a reduced power on the transport link (e.g., other disturbances described above). A determiner 116 is used to determine the cause. In the example of FIG. 1, the determiner, determines that rain is the cause of the disturbance.

In one or more embodiments, the disturbance detection apparatus 110 refrains from transmitting an indication of the disturbance. For example the determiner 116 determines that disturbance 108 is a passing rain storm and no further adjustment of the operation is needed. In this case the disturbance detection apparatus 110 does not send indication of the disturbance (e.g., a warning output). Alternatively, the disturbance detection apparatus 110 suppresses an indication of the disturbance.

In one or more embodiments, the disturbance detection apparatus 110 transmits an indication of the disturbance with an instruction for resolving the disturbance. For example, the disturbance detection apparatus 110 includes an output 118 for sending an indication of the disturbance (e.g., a warning or an alarm) with an instruction for resolving the disturbance (e.g., increase the transmit power). This output 118 could include, for instance, one or more interfaces or transmitters for sending the indication and instruction.

In one or more embodiments the indication and instruction is sent to an operations controller 120 that comprises an input 122 for receiving the indication of a disturbance and instruction for resolving the instruction. For example, the input 122 includes one or more interfaces or receivers for receiving the indication and instruction. The operations controller 120 in one or more embodiments includes an adjuster 124 for adjusting the operation of the transport link 106. For example, the adjuster 124 can send an instruction to the transmitter 120 to increase the transmit power.

Figure 2:
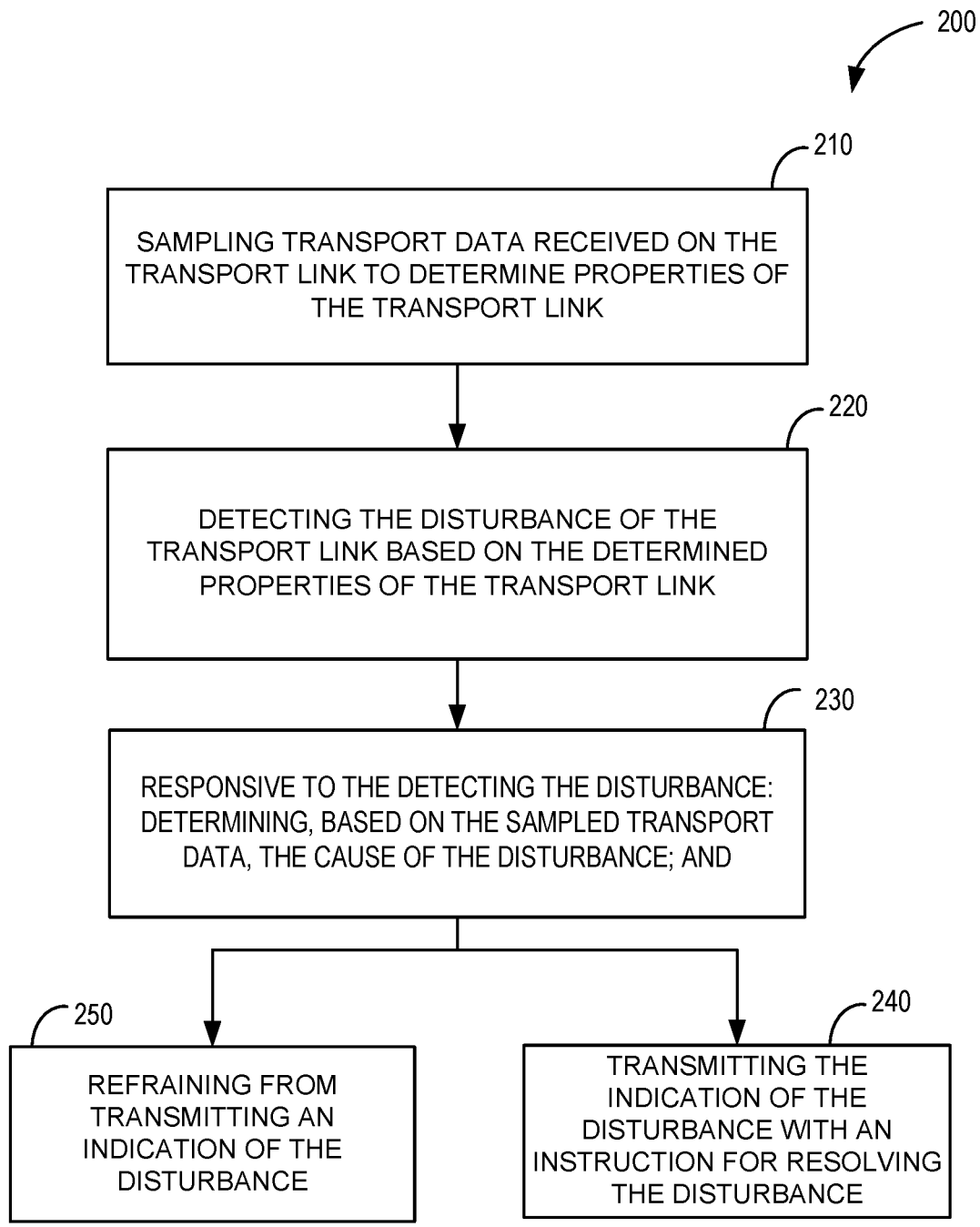
FIG. 2 is a method of detecting a disturbance on a transport link according to an embodiment.
Figure 3:
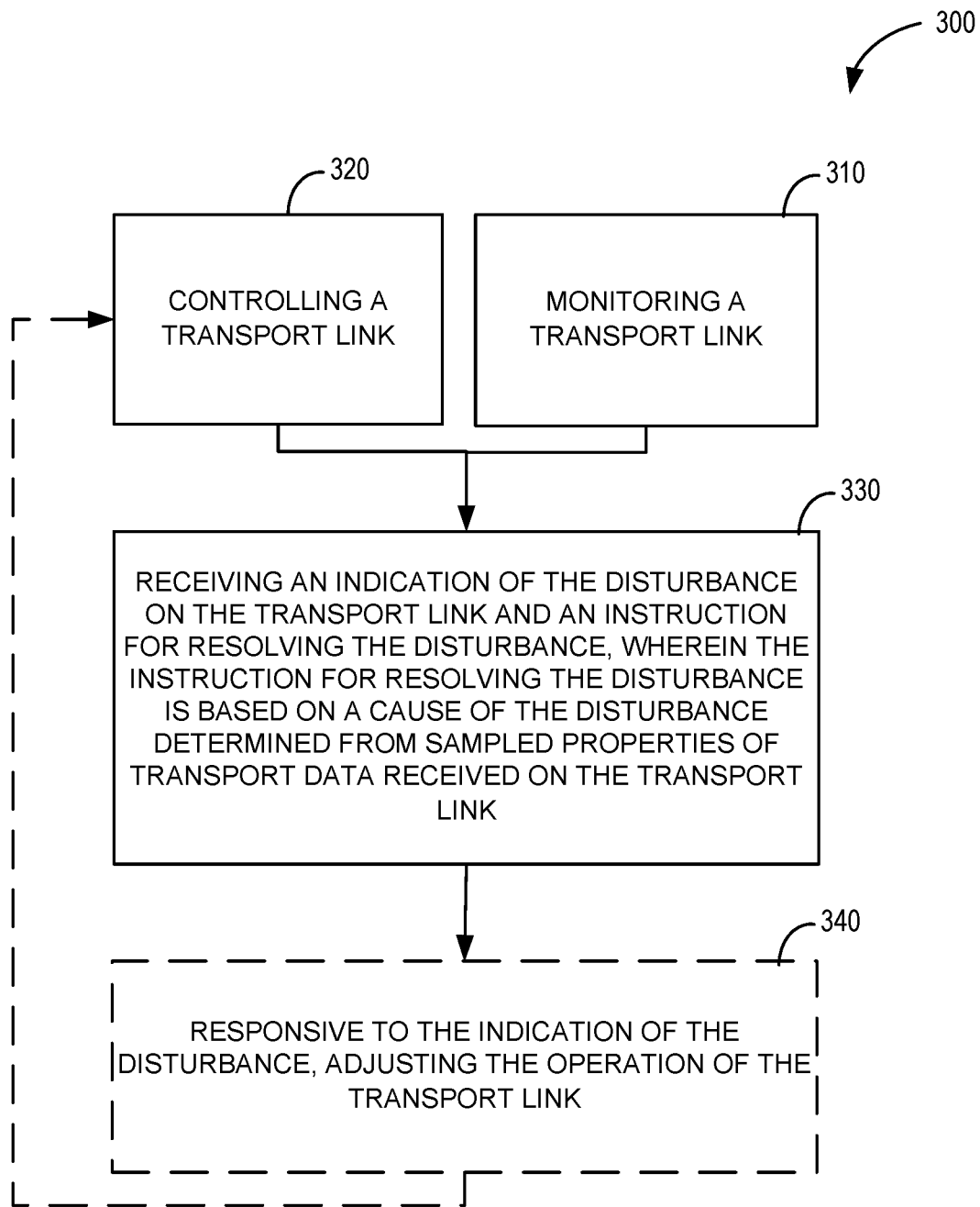
FIG. 3 is a method of receiving a detected disturbance of a transport link.

One or more embodiments include a method for detecting a disturbance of a transport link (e.g., by a disturbance detection apparatus or system). FIG. 2 shows an example method 200 for detecting a disturbance of a transport link (e.g., transport link 106). The method 200 includes sampling the transport data received on the transport link to determine properties of the transport link 106 (e.g., received power) (210). The method 200 includes detecting the disturbance of the transport link based on the determined properties of the transport link (220). The method 200 includes responsive to the detecting the disturbance determining, based on the sampled transport data, the cause of the disturbance (e.g., rain) (230). The method 200 comprises optional or alternative paths responsive to detecting the disturbance (e.g., based on the cause of the disturbance). One option is to refrain from transmitting an indication of the disturbance (250). Another option is to transmit an indication of the disturbance with an instruction for resolving the disturbance (240).

For example, assume a very local, but heavy rain, reduces the performance (or even causes outage) of a certain transport link (or a small set of transport links in the same geographical area). Without the detection apparatus 110, an operator of the transport link (e.g., at a Network Operations Center (NOC)) would get alarms, and not know the reason for the alarm. This might in turn make the operator have the equipment (e.g., transmitter 102 and receiver 104) inspected on site and possibly replace the equipment causing a lot of extra costs for no gain. One or more embodiments herein introduce a method for detecting a disturbance of the transport link and corresponding system or apparatus. In one or more embodiments, the alarms are suppressed, or the operator informed about the reason, which allows the operator to take the appropriate action (e.g. increase transmission power to get good performance even in the presence of rain).

In another example, a heavy rain or wind causes the mounting of the transmitter 102 or receiver 104 to sway causing the disturbance. In this case the instruction will inform the operator to take appropriate action (e.g., mount the equipment on a more stable pole) rather than e.g. replacing working equipment.

Accordingly, embodiments herein also include a method 300 of receiving a detected disturbance of a transport link (e.g., to aid in correcting for the disturbance 108 of transport link 106). The method comprises monitoring (310) or controlling (320) the transport link. In one or more embodiments, the monitoring or controlling is continuous or ongoing. The monitoring is, for instance, monitoring for indications or instructions as described herein. Additionally, or alternatively the controlling, for instance, comprises controlling the operation of a transmitter or receiver of a transport link (e.g., controlling the transmission power of transmitter 102 of transport link 106 in FIG. 1). The method comprises receiving an indication of the disturbance on the transport link and an instruction for resolving the disturbance (330). The instruction for resolving the disturbance is based on a cause of the disturbance determined from sampled properties of transport data received on the transport link.

Optionally, the method 300 comprises responsive to the indication of the disturbance, adjusting the operation of the transport link (340), e.g. by feeding an adjustment to a control of the transport link. In one or more embodiments, the adjustment could be automatic in response to the indication of the disturbance. In alternative embodiments, the adjustment further comprises waiting to adjust based on aggregating indications of disturbances (e.g., using performance monitoring counters or PM counters).

In one or more embodiments, the detection of a disturbance comprises comparing the properties of received transport data to classes of learned channel conditions. For example, the classes of learned channel conditions can represent properties of channels impacted by various disturbances (e.g., a channel impacted by rain, pollen, construction equipment, etc.).

The classes of learned channel conditions in one embodiment are based on a series of sampling performed at the primary transport link and then sampled received transport data is compared to past sampling on the primary link. Alternatively or additionally, the classes of learned channel conditions are based on properties of other secondary transport links as shown in FIG. 4.

Figure 4:
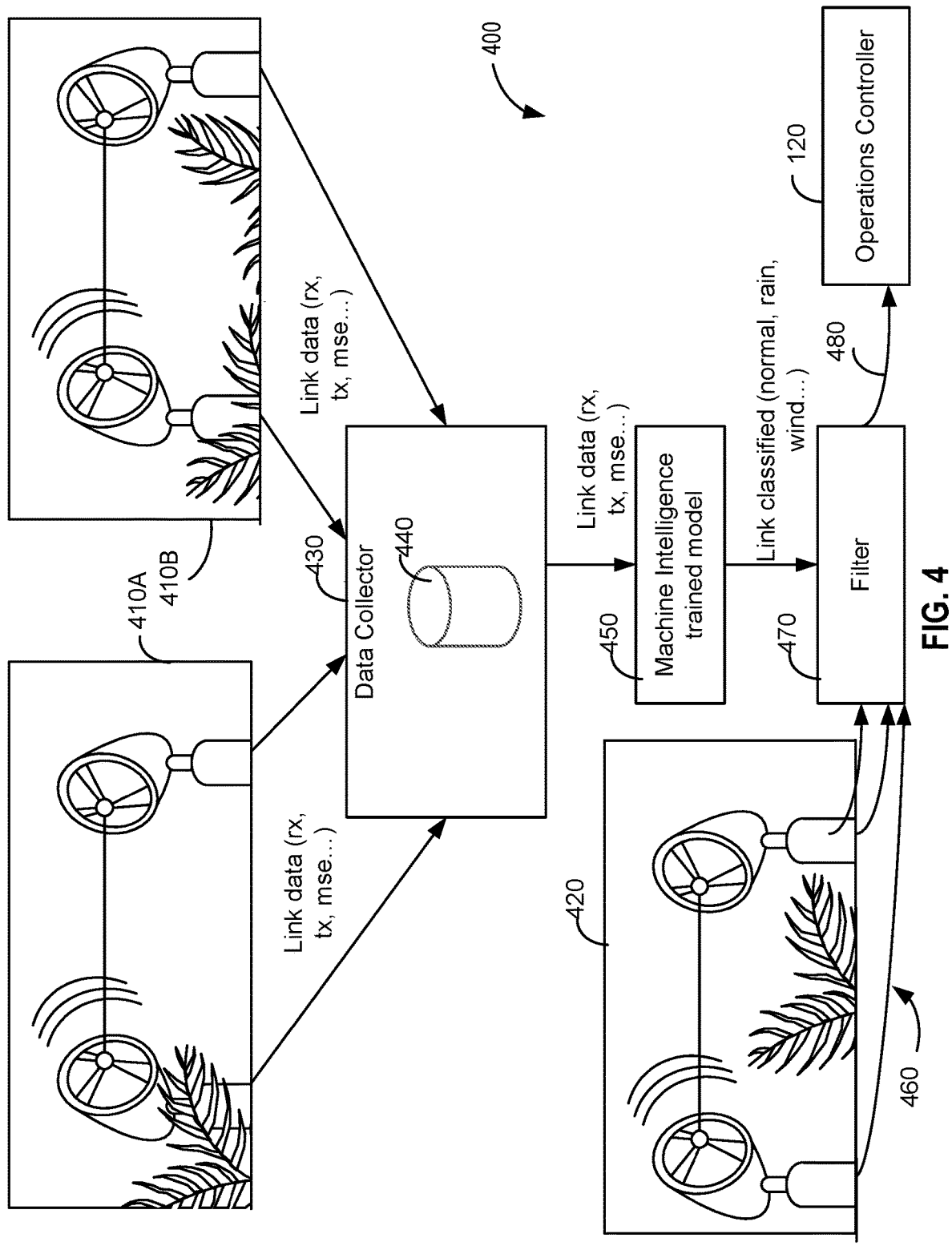
FIG. 4 is a system diagram for detecting a disturbance on a transport link according to an embodiment.

As shown in FIG. 4, the other secondary transport links 410A and 410B are selected based on factors to determine transport links that would behavior similarly in the presence of a disturbance as the primary transport link 420. For example, the secondary transport links 410A and 410B could be selected based on the proximity to the primary transport link 420. Additionally or alternatively, the transport links are selected based on their proximity to an environmental feature (e.g., proximity to a mountain or lake). As shown in FIG. 4, the secondary transport links 410A and 410B are geographically close to primary transport link 420 and have similar trees near the transport link.

One or more embodiments described herein are useful for operation and maintenance of transport networks, and in a preferred embodiment, for microwave links, e.g., the links in FIG. 4, used in transport networks. Microwave frequencies range from 3 Gigahertz (GHz) to 300 GHz, which is equivalent to wavelengths between 10 and 0.1 centimeters. Careful placement of the antennas allow for several links to use the same frequency. This is due to the fact that the microwave beams are extremely narrow and precisely oriented, thus not interfering with other beams. Microwave transmission is done using high frequency which in turn leads to a high bandwidth. However, due to the high frequency transmission, the signals have difficulties passing through mountains and other terrains. Therefore, it is essential to place the antennas strategically in order to avoid obstacles. Compared to lower radio frequencies, signals in the microwave range suffer more from attenuation caused by environmental obstacles (e.g., rain). This becomes especially apparent at frequencies above 10 GHz. Terrain, buildings and trees are obstacles that can cause attenuation, thus the path between the transmitting and receiving antennas must remain unobstructed. One or more embodiments are useful for determining an obstruction and resolving the obstruction.

In one or more embodiments, time series data is taken from a node of a microwave link and together with metadata (if used) form a feature vector which is processed by a classifier to determine the channel conditions/impairments that affect the link. For instance, the classifier is a machine learning model that has been trained beforehand using known data which represent the classes of channel conditions/impairments the classifier should learn to recognize. After the training has been completed the classifier can be said to partition the feature vector space into one region per channel condition/impairment. There is one output node per class, representing the probability that a feature vector belongs to that class. When a new feature vector is classified one then assumes that it belongs to the class whose output node has the largest value (i.e., highest probability).

In a preferred embodiment, link attenuation, i.e. the difference between the transmitted and the received power of a link is repeatedly sampled every predefined interval (e.g., every 10 seconds) over a fixed time duration (e.g., 6 hours) as input for the classifier. In other words a subset of the transport data is sampled at predefined intervals. As another example, received power is sampled (e.g., in a case where the transmitted power is constant during the time interval). A high accuracy in identifying the predefined link behaviors for the network of microwave links is used to train and test the classifier. Patterns can be recognized such that the classifier can identify disturbance reasons such as rain, construction site, multi-path propagation, swaying sender or receiver. For instance, a particular disturbance can be associated with a particular extent of decline in link attenuations (e.g., in a certain threshold range), for a certain amount of time or for certain periods of time that form a pattern. A transport link that exhibits a similar pattern is then classified as experiencing (or having a high probability of experiencing) a similar disturbance. Thus, properties of the transport link as described herein can be considered a pattern on the transport link.

As shown in FIG. 4, each microwave link endpoint of the secondary transport links 410 is regularly and continuously sampled for relevant link data (such as received power, transmit power, and mean square error). The data is collected via a data collector 430 and stored in a persistent storage 440. One of ordinary skill in the art will appreciate the persistent storage 440 could also be separate from the data collector 430. A database of suitable kind (such as MongoDb or InfluxDb) can be used to help administrating the data, and help querying for data. The data in the persistent storage 440 is then processed by a machine intelligence (MI) developed pattern matcher that classifies each link (e.g., a MI trained model 450), for each time period, as belonging to one or more pre-defined classes (such as normal, disturbed by rain, disturbed by multi path fading, disturbed by interference etc.). This data is then used in combination with network alarms 460 to determine whether an alarm is due to a problem in the actual network or network equipment, or due to e.g. heavy rain.

For example as shown in FIG. 4, a filter 470 is used to suppress or filter the alarms, such that only a single alarm or indication of a disturbance 480 goes to an operations controller 120 as described herein. The operations controller 120 is, for example, at a Network Operations Center.

The pattern matching processing is repeated regularly (such as once every minute), but has access to a longer sequence (such as one hour or six hours) of samples for the link being classified stored in the persistent storage (which can also be used for manual inspection if needed to determine the root cause of problems). Machine learning algorithms provide solutions which are efficient at analyzing and finding hidden data patterns. Machine learning can be used to update the classifications. For instance neural networks, deep neural network (DNN), or convolutional neural networks (CNNs), an extension of neural networks are types of machine learning. Classification tasks usually require knowledge about the data in order for feature extraction by human experts. CNNs have the advantage of extracting and learning features, thus not requiring human experts. Time series classification approaches include for example k-nearest neighbour (k-NN) where k is an integer and multi-layer perceptron (MLP).

The normal tools and procedures for operation of transport links includes use of alarms (and possibly PM Counters) that are transferred to a "Network Operations Center" (NOC), where operators look at them and determine if any service action is needed, and if needed, what service action to perform. Current operation of microwave links in transport networks does not use such detection and classification of the reason(s) for disturbances for microwave links as described herein. This means increased cost and potentially increased outage for (some of) the link. Accordingly, one or more embodiments herein can provide advantages including:

reduce load on personnel (and reduce the need for personnel) in a Network Operation Center by not presenting alarms that are due to reasons that are beyond the control of the operator;

improve the network performance by presenting the probable reason with alarms, allowing the correct action to be taken;

reduce the cost of maintaining the transport link due to reducing the number of site visits by technicians; and reduce the amount of hardware returns by identifying that the reason for alarms has nothing to do with any hardware fault. This can reduce costs not only for the network owner but also for the equipment provider.

These advantages are only examples and other advantages will be appreciated by one of ordinary skill in the art and in other contexts beyond microwave transport links. For instance, the transport link in one or more embodiments is used for other transport links used to transport data (e.g., audio and video data). For instance, the transport link in one or more embodiments is used for non-line-of-sight transport (e.g., in band backhaul) or is used for wired transport data (e.g., optical fibers).

Note that the apparatuses described above can perform the methods herein and any other processing by implementing any functional means, modules, units, or circuitry. In one embodiment, for example, the apparatuses comprise respective circuits or circuitry configured to perform the steps shown in the method figures. The circuits or circuitry in this regard can comprise circuits dedicated to performing certain functional processing and/or one or more microprocessors in conjunction with memory. For instance, the circuitry can include one or more microprocessor or microcontrollers, as well as other digital hardware, which can include digital signal processors (DSPs), special-purpose digital logic, and the like. The processing circuitry can be configured to execute program code stored in memory, which can include one or several types of memory such as read-only memory (ROM), random-access memory, cache memory, flash memory devices, optical storage devices, etc. Program code stored in memory can include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Figure 5:
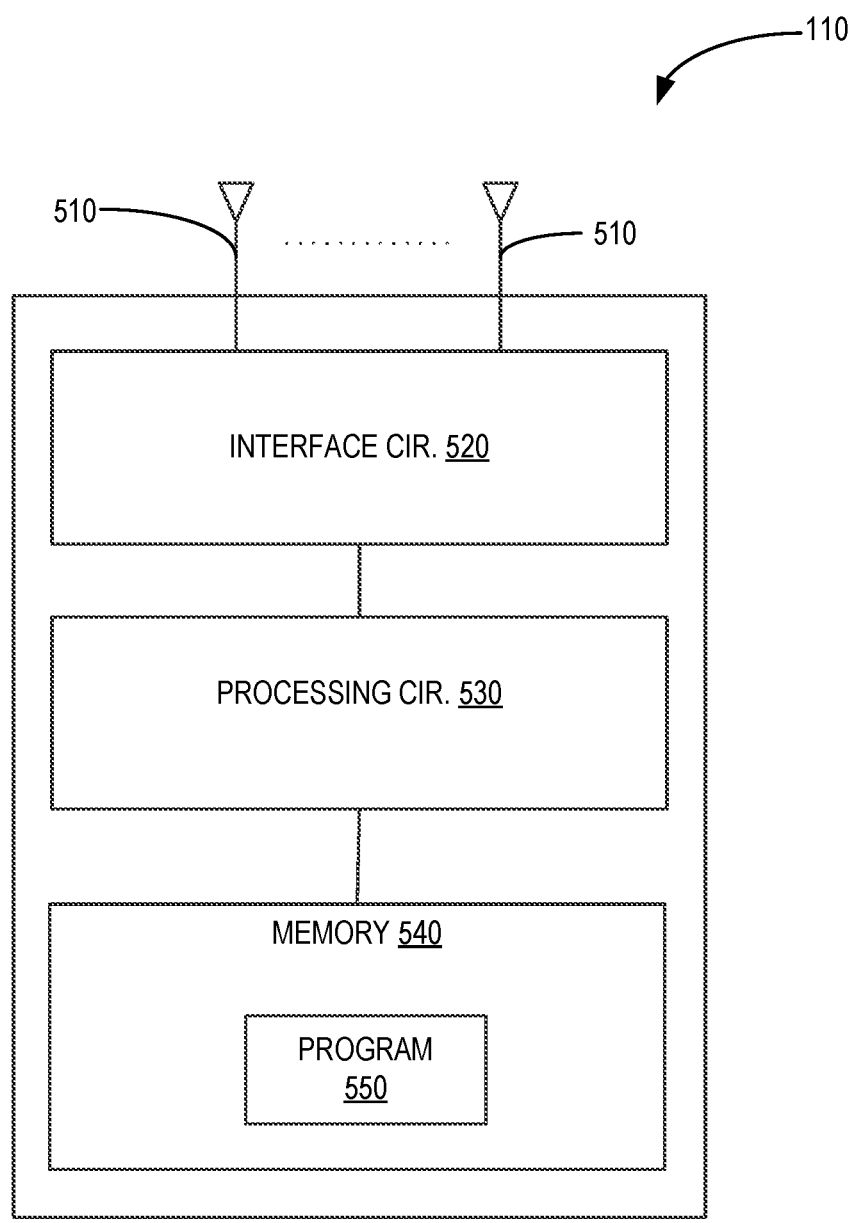
FIG. 5 is a diagram of a disturbance detection apparatus according to an embodiment.

FIG. 5 for example, illustrates an example disturbance detection apparatus 110 as described herein. As shown, the disturbance detection apparatus 110 includes processing circuitry 530 and interface circuitry 520. The interface circuitry 520 (e.g., radio circuitry) is configured to transmit and/or receive information to and/or from one or more other nodes, e.g., via any communication technology. Such communication can occur via one or more antennas 510 that are either internal or external to the disturbance detection apparatus 110. For example, the interface circuitry 520 is configured to receive sampled transport data and output an indication of a disturbance and an instruction for resolving the disturbance. The processing circuitry 530 is configured to perform processing described above, such as by executing instructions of a program 550 stored in memory 540. The processing circuitry 530 in this regard can implement certain functional means, units, or modules.

Figure 6:
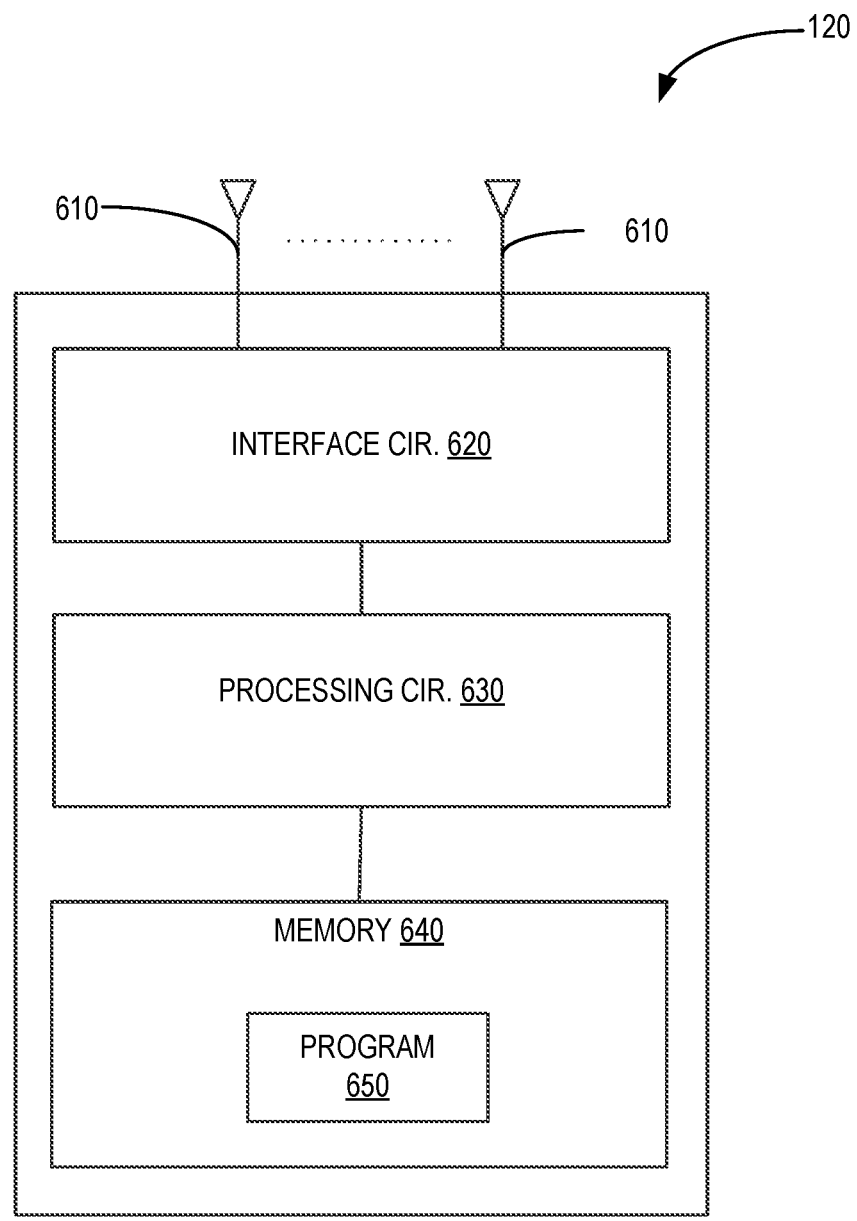
FIG. 6 is a diagram of an operations controller according to an embodiment.

FIG. 6 for example, illustrates an example operations controller 120 as described herein. As shown, the operations controller 120 includes processing circuitry 630 and interface circuitry 620. The interface circuitry 620 (e.g., radio circuitry) is configured to transmit and/or receive information to and/or from one or more other nodes, e.g., via any communication technology. Such communication can occur via one or more antennas 610 that are either internal or external to the operations controller 120. For example, the interface circuitry 620 is configured to receive an indication of a disturbance and an instruction for resolving the disturbance and output an adjustment to a transport link. The processing circuitry 630 is configured to perform processing described above, such as by executing instructions of a program 650 stored in memory 640. The processing circuitry 630 in this regard can implement certain functional means, units, or modules.

Figure 7A:
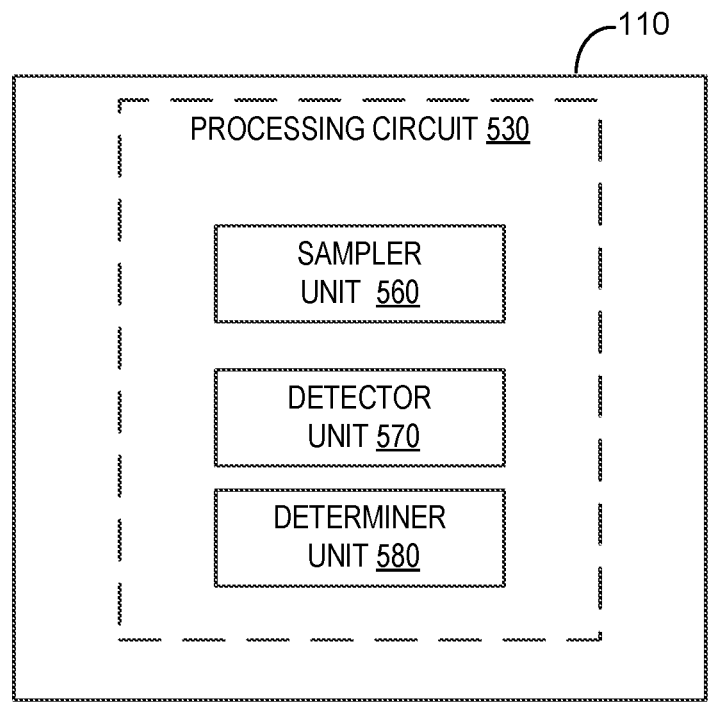
FIG. 7A is a diagram of a disturbance detection apparatus according to an embodiment.

FIG. 7A illustrates a schematic block diagram of a disturbance detection apparatus 110 according to still other embodiments. As shown in FIG. 7A, the disturbance detection apparatus 110 implements various functional means, units, or modules, e.g., via the processing circuitry 530 in FIG. 5 and/or via software code. These functional means, units, or modules, e.g., for implementing the method(s) herein, include for instance a sampler unit 560 configured to sample received transport data to determine properties of the transport link; a detector unit 570 configured to detect the disturbance of the transport link based on the determined properties of the transport link; a determiner unit 580 configured to determine, based on the sampled transport data, the cause of the disturbance.

Figure 7B:
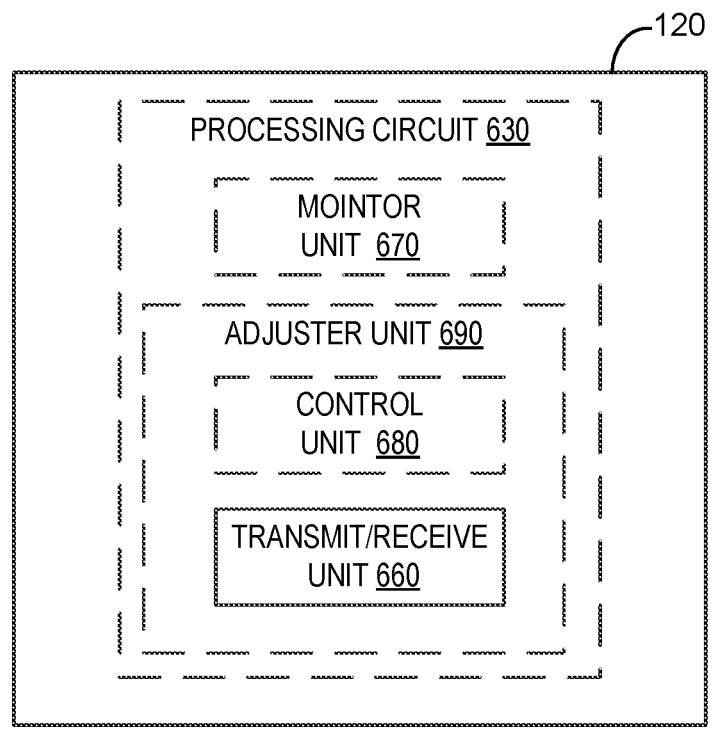
FIG. 7B is a diagram of an operations controller according to an embodiment.

FIG. 7B illustrates a schematic block diagram of an operations controller 120 according to still other embodiments. As shown in FIG. 7B, the operations controller 120 implements various functional means, units, or modules, e.g., via the processing circuitry 630 in FIG. 6 and/or via software code. These functional means, units, or modules, e.g., for implementing the method(s) herein, include for instance a transmit/receive unit 660 configured to receive an indication of a disturbance on the transport link and an instruction for resolving the disturbance and to output any controls for controlling the operation of the transport link; a control unit 680 configured to control the transport link; a monitor unit 670 configured to monitor the transport link. In one or more embodiments, the operations controller 120 comprises an adjuster unit 690 configured to responsive to the indication of the disturbance, adjust the operation of the transport link The disturbance detection apparatus 110 is shown in FIGS. 1 and 5 as a single apparatus as an example. However, one of ordinary skill in the art will appreciate that the components (e.g., components 112, 114, 116, and 118) of the disturbance detection apparatus 110 could be distributed across different apparatus or network nodes and could be connected via a local network or reachable via a cellular network or internet network. Thus, the disturbance detection apparatus 110 is in one or more embodiments is a system for detecting a disturbance as described herein. Further, a secure tunnel can be setup between the equipment at the endpoint of the transport link for getting the sampled data to a sampler or other analyzer in a secure manner that does not comprise the security of the transport data.

Likewise the operations controller 120 is shown in FIGS. 1 and 6 as a single apparatus, as an example. However, one of ordinary skill in the art will appreciate that the components (e.g., input 122 and adjuster 124) of the operations controller 120 could be distributed across different apparatus or network nodes and could be connected via a local network or reachable via a cellular network or internet network. Thus, the operations controller 120 is in one or more embodiments a system for receiving an indication of a disturbance as described herein.

What is claimed is:

1. A method of detecting a disturbance of a transport link, the method comprising:
    sampling transport data received on the transport link to determine properties of the transport link;
    detecting the disturbance of the transport link based on the determined properties of the transport link; and
    responsive to the detecting the disturbance:
        determining, based on the sampled transport data, the cause of the disturbance; and
        refraining from transmitting an indication of the disturbance or transmitting the indication of the disturbance with an instruction for resolving the disturbance.

2. The method of claim 1, wherein the refraining from the transmitting the indication comprises suppressing a warning indication of a declined performance for the transport data received on the transport link.

3. The method of claim 1, wherein the method further comprises receiving the transport data and sampling a subset of the transport data at predetermined intervals.

4. The method of claim 1, wherein the cause of the disturbance is caused by liquids or solids in the path of the transport link.

5. The method of claim 1, wherein the cause of the disturbance is malfunction of the equipment at an endpoint of the transport link, and the method comprises transmitting the indication of the disturbance with an instruction related to the malfunction of the equipment.

6. The method of claim 1, wherein the cause of the disturbance is movement of the transmitter or receiver at an endpoint of the transport link, and the method comprises transmitting the indication of the disturbance with an instruction related to correcting the movement of the transmitter or receiver.

7. The method of claim 1, wherein the cause of the disturbance is a temporary obstacle in the path of the transport link, and the method comprises selectively determining whether to refrain from sending the indication or transmit the indication with an instruction related to increasing the transmission power of an end point of the transport link.

8. The method of claim 1, wherein the detecting comprises comparing the properties of the received transport data to classes of learned channel conditions.

9. The method of claim 8, wherein the sampling comprises forming a vector of channel conditions, and the detecting the disturbance comprises classifying the vector as a particular channel condition.

10. The method of claim 8, wherein the classes of learned channel conditions are based on sampling of received transport data on other transport links.

11. The method of claim 10, wherein the other transport links are selected based on their proximity to the transport link or proximity to an environmental feature.

12. The method of claim 10, wherein the classes of learned channel conditions are based on sampling of other received transport data received on the transport link.

13. The method of claim 1, wherein the properties of the transport link include an attenuation of the transport link.

14. The method of claim 13, wherein the properties of the transport link further include a quality of a received signal associated with the received transport data on the transport link.

15. The method of claim 14, wherein the sampling comprises sampling one or more of a received power, a transmission power, and a mean square error (MSE) associated with the received transport data.

16. The method of claim 1, wherein the transport link is a microwave transport link.

17. The method of claim 1, wherein the transport data is one or more of audio and video data.

18. A disturbance detection apparatus for detecting a disturbance of a transport link, the disturbance detection apparatus comprising:
   a processor; and
   memory, the memory containing instructions executable by the processor whereby the disturbance detection apparatus is configured to:
      sample transport data received on the transport link to determine properties of the transport link;
      detect the disturbance of the transport link based on the determined properties of the transport link; and
      responsive to detecting the disturbance:
         determine, based on the sampled transport data, the cause of the disturbance; and
         refrain from transmitting an indication of the disturbance or transmit the indication of the disturbance with an instruction for resolving the disturbance.

19. The disturbance detection apparatus of claim 18, wherein the memory contains the instructions executable by the processor whereby the disturbance detection apparatus is configured to refrain from transmitting the indication by suppressing a warning indication of a declined performance for the transport data received on the transport link.

20. The disturbance detection apparatus of claim 18, wherein the memory contains the instructions executable by the processor whereby the disturbance detection apparatus is further configured to:
   receive the transport data; and
   sample a subset of the transport data at predetermined intervals.

21. The disturbance detection apparatus of claim 18, wherein the memory contains the instructions executable by the processor whereby the disturbance detection apparatus is configured to detect the disturbance of the transport link by comparing the properties of the transport data to classes of learned channel conditions.

22. The disturbance detection apparatus of claim 21, wherein the memory contains the instructions executable by the processor whereby the disturbance detection apparatus is configured to:
   sample the transport data by forming a vector of channel conditions; and
   detect the disturbance of the transport link by classifying the vector as a particular channel condition.

* * * * *